US 12,103,525 B2

(12) United States Patent
Itazuri (10) Patent No.: US 12,103,525 B2
(45) Date of Patent: Oct. 1, 2024

(54) LANE DEPARTURE AVOIDANCE DEVICE

(71) Applicant: TOYOTA JIDOSHA KABUSHIKI KAISHA, Toyota (JP)

(72) Inventor: Kazuki Itazuri, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 309 days.

(21) Appl. No.: 17/863,730

(22) Filed: Jul. 13, 2022

(65) Prior Publication Data

US 2023/0023751 A1   Jan. 26, 2023

(30) Foreign Application Priority Data

Jul. 21, 2021 (JP) ................................. 2021-120620

(51) Int. Cl.
*B60W 30/12* (2020.01)
*B60W 50/14* (2020.01)

(52) U.S. Cl.
CPC ............ *B60W 30/12* (2013.01); *B60W 50/14* (2013.01); *B60W 2510/202* (2013.01); *B60W 2520/10* (2013.01); *B60W 2710/20* (2013.01)

(58) Field of Classification Search
CPC ................. B60W 30/12; B60W 50/14; B60W 2510/202; B60W 2520/10; B60W 2710/20

See application file for complete search history.

(56) References Cited

U.S. PATENT DOCUMENTS

| 7,206,684 B2 * | 4/2007 | Takeda ................ B60T 8/17557 348/148 |
| 7,539,566 B2 * | 5/2009 | Tange ................. B60T 8/17557 701/41 |
| 8,090,516 B2 * | 1/2012 | Yonezawa ............. B60W 30/12 701/82 |
| 9,862,382 B2 * | 1/2018 | Nakamura .......... B60W 30/095 |
| 2005/0096827 A1 * | 5/2005 | Sadano ..................... B60T 7/22 701/1 |
| 2005/0096829 A1 * | 5/2005 | Sugano ............... B60T 8/17557 701/1 |
| 2006/0142922 A1 * | 6/2006 | Ozaki ................ B60W 40/064 701/70 |
| 2018/0105171 A1 * | 4/2018 | Tsuji ................... B60W 30/146 |
| 2022/0204082 A1 | 6/2022 | Fukutomi |

FOREIGN PATENT DOCUMENTS

JP          2019-177762 A    10/2019

* cited by examiner

*Primary Examiner* — Gertrude Arthur Jeanglaude
(74) *Attorney, Agent, or Firm* — Sughrue Mion, PLLC (57) ABSTRACT

A lane departure avoidance device includes a control unit that executes a lane departure prevention control by at least one of automatically turning a turning wheel and issuing an alarm, when it is determined that there is a possibility that a vehicle crosses a lane border and a driver has no intention of performing a lane departure, and that suspends executing the lane departure prevention control, when it is determined that there is a possibility that the vehicle crosses the lane border and the driver intentions to perform the lane departure. The control unit continues to suspend executing the lane departure prevention control, when it is determined that there is another lane border on a side that the vehicle approaches and that a distance from the vehicle to the other lane border is a reference distance or more, in a situation where executing the lane departure prevention control is suspended.

8 Claims, 5 Drawing Sheets

LANE DEPARTURE AVOIDANCE DEVICE

CROSS-REFERENCE TO RELATED APPLICATION

This application claims priority to Japanese Patent Application No. 2021-120620 filed on Jul. 21, 2021, incorporated herein by reference in its entirety.

BACKGROUND

1. Technical Field

The present disclosure relates to a lane departure avoidance device for a vehicle such as an automobile.

2. Description of Related Art

The lane departure avoidance device detects the position of a vehicle relative to a lane with a vehicle position detection device, and executes a lane departure prevention control by at least one of the automatic turning of a turning wheel and the issuing of an alarm, when it is determined that there is a possibility that the vehicle departs from the lane based on the detected position of the vehicle.

Even when it is determined that there is a possibility that the vehicle departs from the lane, it is necessary to restrict the lane departure prevention control in the case where the driver has an intention to perform a lane departure such as lane change. Whether the driver has the intention to perform the lane departure is determined based on the steering operation by the driver, the operation of a turn signal lever by the driver, the inclination angle of the vehicle with respect to the lane, that is, the oblique motion angle, and the like.

For example, Japanese Unexamined Patent Application Publication No. 2019-177762 (JP 2019-177762 A) describes that the lane departure prevention control is restricted when a steering velocity equal to or higher than a reference value, a steering torque equal to or higher than a reference value and/or a steering torque change amount equal to or larger than a reference value are detected. With this kind of lane departure avoidance device, in a situation where the driver attempts to perform the lane departure such as lane change, it is possible to reduce a possibility that the automatic turning of the turning wheel by the lane departure prevention control interferes with the driving operation by the driver.

SUMMARY

Even in conventional lane departure avoidance devices such as the lane departure prevention device disclosed in JP 2019-177762 A, the lane departure prevention control is sometimes executed without being restricted, depending on the traveling situation of the vehicle. For example, as described later in detail, in the case where the driver attempts to move the vehicle to a side road that branches from a main road at a small inclination angle, it is sometimes determined that the driver has no intention to perform a lane departure for a lane border on the side road even when it is determined that the driver has an intention to perform a lane departure for a lane border on the main road. Therefore, even when the driver attempts to move the vehicle to the side road, the automatic turning of the turning wheel by the lane departure prevention control interferes with the driving operation by the driver. Consequently, the driver cannot smoothly move the vehicle to the side road as the driver wishes, and sometimes has a strangeness feeling.

A main object of the present disclosure is to provide an improved lane departure avoidance device that can restrict the lane departure prevention control even in the case the driver attempts to move the vehicle to the side road that branches from the main road at a small inclination angle.

The present disclosure provides a lane departure avoidance device (100) including: a vehicle position detection device (camera sensor 12) configured to detect the position of a vehicle (50) relative to a lane (54); and a control unit (LDA ECU 10) configured to execute a lane departure prevention control by at least one of automatic turning of a turning wheel (24) and issuing of an alarm (S50), when it is determined that there is a possibility that the vehicle crosses a first lane border (56L) based on the position of the vehicle that is detected by the vehicle position detection device and that a driver of the vehicle that crosses the first lane border has no intention to perform a lane departure (S20, S30), and to suspend the execution of the lane departure prevention control (S10, S40) until it is determined that a previously set control resuming condition is satisfied (S60), when it is determined that there is a possibility that the vehicle crosses the first lane border and that the driver of the vehicle that crosses the first lane border has an intention to perform the lane departure.

The control unit (LDA ECU 10) is configured to continue the suspension of the execution of the lane departure prevention control, when it is determined that there is a second lane border (64) on a side that the vehicle approaches and that a distance from the vehicle to the second lane border is equal to or greater than a reference distance (Lsc), in a situation where the execution of the lane departure prevention control is suspended and where the control resuming condition is not satisfied.

With the above configuration, the suspension of the execution of the lane departure prevention control is continued, when it is determined that there is the second lane border on the side that the vehicle approaches and that the distance from the vehicle to the second lane border is equal to or greater than the reference distance, in the situation where the execution of the lane departure prevention control is suspended and where the control resuming condition is not satisfied. Consequently, even in the case where the driver attempts to move the vehicle to the side road that branches from the main road at a small inclination angle, the lane departure prevention control is not executed. Accordingly, the automatic turning of the turning wheel does not interfere with the driving operation by the driver, and an alarm device is not actuated. Therefore, the driver can smoothly move the vehicle to the side road as the driver wishes.

Aspects of Disclosure

In an aspect of the present disclosure, the control unit (LDA ECU 10) may variably set the reference distance depending on a vehicle velocity(V), such that the reference distance (Lsc) is greater as the vehicle velocity is higher.

As the vehicle velocity is higher, the velocity at which the vehicle approaches the second lane border is higher and the possibility that the vehicle crosses the second lane border is higher. Therefore, it is preferable that the reference distance be greater as the vehicle velocity is higher. With the above aspect, the reference distance is variably set depending on the vehicle velocity, such that the reference distance is greater as the vehicle velocity is higher. Consequently, it is possible to appropriately determine whether the possibility that the vehicle crosses the second lane border is high and whether it is necessary to execute the lane departure prevention control for the second lane border, compared to the case where the reference distance is constant regardless of the vehicle velocity.

In another aspect of the present disclosure, the control unit (LDA ECU 10) may execute the lane departure prevention control for the second lane border, when it is determined that there is a possibility that the vehicle is placed in a dangerous situation when the vehicle (50) crosses the second lane border (64), in a situation where the suspension of the execution of the lane departure prevention control is continued.

In the above aspect, the lane departure prevention control for the second lane border is executed, when it is determined that there is a possibility that the vehicle is placed in a dangerous situation when the vehicle crosses the second lane border, in the situation where the suspension of the execution of the lane departure prevention control is continued. Consequently, by the lane departure prevention control, it is possible to reduce the possibility that the vehicle crosses the second lane border and the vehicle is placed in a dangerous situation.

Furthermore, in another aspect of the present disclosure, the control unit (LDA ECU 10) may execute the lane departure prevention control for the second lane border, when it is determined that a steering torque (Ts) in a direction in which the vehicle (50) approaches the second lane border (64) is equal to or lower than a reference torque (Tac), in a situation where the suspension of the execution of the lane departure prevention control is continued.

When the steering torque in the direction in which the vehicle approaches the second lane border is higher than the reference torque, it is likely that the driver hopes to cause the vehicle to approach the second lane border. On the other hand, when the steering torque in the direction in which the vehicle approaches the second lane border is equal to or lower than the reference torque, it is likely that there is a possibility that the vehicle crosses the second lane border because the vehicle approaches the second lane border due to driver's carelessness or the like.

With the above aspect, the lane departure prevention control for the second lane border is executed, when it is determined that the steering torque in the direction in which the vehicle approaches the second lane border is equal to or lower than the reference torque, in the situation where the suspension of the execution of the lane departure prevention control is continued. Consequently, by the lane departure prevention control, it is possible to reduce the possibility that the vehicle crosses the second lane border.

Furthermore, in another aspect of the present disclosure, the control unit (LDA ECU 10) may execute the lane departure prevention control for the second lane border, when it is determined that a velocity (Va) at which the vehicle (50) approaches the second lane border (64) is equal to or higher than a reference velocity (Vac) and that the steering torque (Ts) in the direction in which the vehicle approaches the second lane border is equal to or lower than the reference torque (Tac).

With the above aspect, the lane departure prevention control for the second lane border is executed when it is determined that the velocity at which the vehicle approaches the second lane border is equal to or higher than the reference velocity and that the steering torque in the direction in which the vehicle approaches the second lane border is equal to or lower than the reference torque. Consequently, in a situation where the possibility that the vehicle crosses the second lane border is high because the vehicle rapidly approaches the second lane border due to driver's careless-ness or the like, it is possible to reduce the possibility that the vehicle crosses the second lane border, by the lane departure prevention control.

Furthermore, in another aspect of the present disclosure, the control unit (LDA ECU 10) may variably set the reference velocity (Vac) depending on a vehicle velocity (V), such that the reference velocity is lower as the vehicle velocity is higher.

As the vehicle velocity is higher, the velocity at which the vehicle approaches the second lane border is higher and the possibility that the vehicle crosses the second lane border is higher. Therefore, it is preferable that the reference velocity be lower as the vehicle velocity is higher. With the above aspect, the reference velocity is variably set depending on the vehicle velocity, such that the reference velocity is lower as the vehicle velocity is higher. Consequently, it is possible to appropriately determine whether the possibility that the vehicle crosses the second lane border is high and whether it is necessary to execute the lane departure prevention control for the second lane border, compared to the case where the reference velocity is constant regardless of the vehicle velocity.

Furthermore, in another aspect of the present disclosure, the control unit (LDA ECU 10) may variably set the reference torque depending on a vehicle velocity (V), such that the reference torque (Tac) is lower as the vehicle velocity is higher.

The steering resistance when the turning wheel is turned by driver's steering operation is lower as the vehicle velocity is higher. Therefore, it is preferable that the reference torque is lower as the vehicle velocity is higher. With the above aspect, the reference torque is variably set depending on the vehicle velocity, such that the reference torque is lower as the vehicle velocity is higher. Consequently, it is possible to appropriately determine whether the driver attempts to move the vehicle by the steering operation in the direction in which the vehicle approaches the second lane border, compared to the case where the reference torque is constant regardless of the vehicle velocity.

Furthermore, in another aspect of the present disclosure, the control unit (LDA ECU 10) may execute the lane departure prevention control for the second lane border, when it is determined that the distance from the vehicle (50) to the second lane border (64) is less than the reference distance (Lsc), and may variably set the reference distance depending on a possibility that the vehicle is placed in a dangerous situation when the vehicle crosses the second lane border, such that the reference distance is greater as the possibility that the vehicle is placed in the dangerous situation is higher.

With the above aspect, the reference distance is variably set depending on the possibility that the vehicle is placed in the dangerous situation when the vehicle crosses the second lane border, such that the reference distance is greater as the possibility that the vehicle is placed in the dangerous situation is higher. Consequently, as the possibility that the vehicle is placed in the dangerous situation when the vehicle crosses the second lane border is higher, it is determined more easily that the distance from the vehicle to the second lane border is less than the reference distance, so that it is possible to effectively execute the lane departure prevention control for the second lane border.

In the above description, for facilitating understanding of the present disclosure, names and/or reference characters that are used in an embodiment described later are put, in parentheses, to constituents in the disclosure that correspond to constituents in the embodiment. However, the constituent elements in the present disclosure are not limited to the constituent elements in the embodiment that correspond to the names and/or reference characters put in parentheses. Other objects, other characteristics and corresponding advantages of the present disclosure will be easily understood from the following description of the embodiment of the present disclosure with reference to the drawings.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
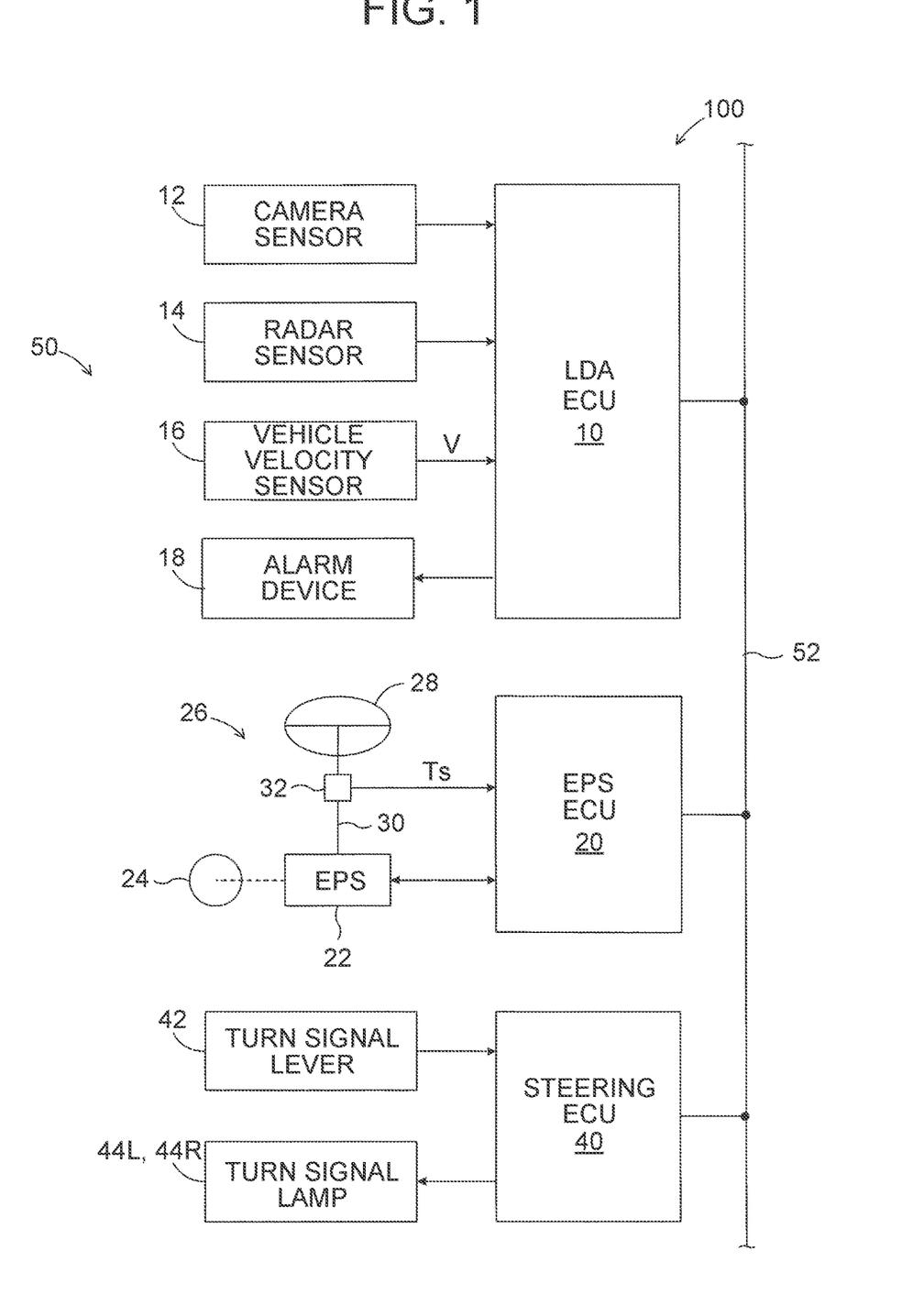
FIG. 1 is a schematic configuration diagram showing an embodiment of a lane departure avoidance device according to the present disclosure.

A lane departure avoidance device according to an embodiment of the present disclosure will be described below in detail with reference to the accompanying drawings.
Configuration As shown in FIG. 1, the lane departure avoidance device 100 according to the embodiment is applied to a vehicle 50, and includes a lane departure avoidance ECU 10, an electric power steering ECU 20 and a steering ECU 40. In the specification, the lane departure avoidance is referred to as an LDA (an abbreviation for Lane Departure Alert with Control) as necessary, and the electric power steering is referred to as an EPS (an abbreviation for Electric Power Steering) as necessary.

The ECUs are electronic control units that include microcomputers as major parts, and are connected so as to be capable of mutually sending and receiving information through a controller area network (CAN) 52. Each microcomputer includes a CPU, a ROM, a RAM, a non-volatile memory, an interface and the like. The CPU realizes various functions by executing instructions (programs or routines) stored in the ROM. Some or all of the ECUs may be incorporated in a single ECU.

As described later in detail, the ROM of the LDA ECU 10 stores a program of a lane departure avoidance control corresponding to a flowchart shown in FIG. 2, and the CPU executes the lane departure avoidance control in accordance with the program. The LDA ECU 10 is connected with a camera sensor 12, a radar sensor 14, a vehicle velocity sensor 16, an alarm device 18, and an LDA switch that is not illustrated in the figure.

The camera sensor 12 includes a camera unit and a lane recognition unit that recognizes a white line on a road by analyzing image data obtained through the photographing by the camera unit. The camera sensor 12 (camera unit) photographs a forward sight of the vehicle 50. The camera sensor 12 (lane recognition unit) repeatedly supplies to the LDA ECU 10, information relevant to the recognized white line, whenever a predetermined computation period elapses.

Figure 6:
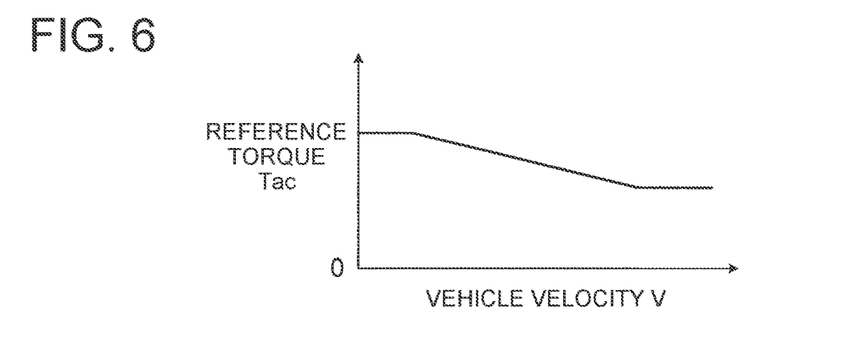
FIG. 6 is a map for computing a reference torque Tac based on the vehicle velocity V.

As shown in FIG. 6, the camera sensor 12 can recognize white lines 56L, 56R that are borders (referred to as lane borders) of a lane 54, and can detect a relative position relation of the vehicle to the lane 54, based on a relation between the white line and the position of the vehicle 50. The position of the vehicle 50 is the position of a gravity center 50A of the vehicle, but may be the center position of the vehicle in planar view. A later-described lateral position of the vehicle means the position of the gravity center of the vehicle in a lane width direction, and a lateral velocity of the vehicle means the velocity of the gravity center position of the vehicle in the lane width direction. The lateral position and the lateral velocity are evaluated based on the relative position relation between the white line and the vehicle that is detected by the camera sensor 12.

The radar sensor 14 includes a radar sending and receiving unit and a signal processing unit (not illustrated). The radar sending and receiving unit emits an electric wave (referred to as a "millimeter wave" hereinafter) in millimeter waveband, and receives a millimeter wave (that is, a reflected wave) reflected by a three-dimensional object (for example, another vehicle, a bicycle, a guardrail, or a structure on the roadside) that exists in the emission range. The signal processing unit acquires information indicating the distance between the vehicle 50 and the three-dimensional object, the relative velocity between the vehicle 50 and the three-dimensional object, the relative position (direction) of the three-dimensional object to the vehicle 50 and the like, based on the phase difference between the sent millimeter wave and the received reflection wave, the attenuation level of the reflected wave, the time from the sending of the millimeter wave to the receiving of the reflected wave, and the like, whenever a predetermined time elapses, and supplies the acquired information to the LDA ECU 10.

The vehicle velocity sensor 16 detects a vehicle velocity V of the vehicle 50, and repeatedly supplies a signal indicating the vehicle velocity V to the LDA ECU 10 with a predetermined control period. The LDA switch is operated by a driver, and supplies a signal indicating whether the LDA switch is in an on-state, to the LDA ECU 10. The on-state of the LDA switch means a state where the lane departure avoidance control is executed.

When the LDA ECU 10 determines that there is a possibility that the vehicle 50 departs from the lane 54, the alarm device 18 is actuated, and issues an alarm as a lane departure prevention control, that is, issues an alarm indicating that there is a possibility that the vehicle 50 departs from the lane. The alarm device 18 may be any of an alarm device that puts out a visual alarm such as an alarm lamp light, an alarm device that puts out an auditory alarm such as an alarm buzzer sound and an alarm device that puts out a physical alarm such as the vibration of a seat, or may be an arbitrary combination of the alarm devices.

The EPS ECU 20 can turn a turning wheel 24 by controlling an EPS device 22, as necessary. Consequently, the EPS ECU 20 and the EPS device 22 constitute a turning device 26 that automatically turns the turning wheel 24 as necessary. When the LDA ECU 10 determines that there is a possibility that the vehicle 50 departs from the lane, the EPS ECU 20 performs the automatic turning of the turning wheel 24 for preventing the vehicle from departing from the lane, as another lane departure prevention control.

As shown in FIG. 1, a steering shaft 30 is integrally coupled with a steering wheel 28 that is operated by the driver, and is provided with a torque sensor 32 that detects a steering torque Ts. A signal indicating the steering torque Ts detected by the torque sensor 32 is input to the EPS ECU 20. The EPS ECU 20 controls the EPS device 22 based on the steering torque Ts and the vehicle velocity V detected by the vehicle velocity sensor 16, in a way that is known in the technical field, and thereby controls a steering assist torque, so that the steering load on the driver is reduced. A signal indicating the steering torque Ts is input from the EPS ECU 20 to the LDA ECU 10 through the CAN 52.

The steering ECU 40 is connected with a turn signal lever 42 and turn signal lamps 44L, 44R that are operated by the driver. The steering ECU 40 blinks front and rear turn signal lamps 44L on the left side of the vehicle 50 when the turn signal lever 42 is tilted in the left-turn direction of the vehicle 50, and blinks front and rear turn signal lamps 44R on the right side of the vehicle 50 when the turn signal lever 42 is tilted in the right-turn direction of the vehicle 50. Tilt information about the turn signal lever 42 is input from the steering ECU 40 to the LDA ECU 10 through the CAN 52.

Lane Departure Avoidance Control Routine

Next, a lane departure avoidance control routine in the embodiment will be described with reference to a flowchart shown in FIG. 2. The lane departure avoidance control in the flowchart shown in FIG. 2 will be repeatedly executed by the CPU of the LDA ECU 10, with a predetermined control period, when the LDA switch that is not illustrated in FIG. 1 is in the on-state. In the following description, the lane departure avoidance control is referred to as merely "control".

First, in step S10, the CPU determines whether a flag Foff is 1, that is, whether the lane departure prevention control is not being executed. In the case of the positive determination, the CPU causes the control to transition to step S60, and in the case of the negative determination, the CPU causes the control to transition to step S20. The flag Foff is initialized to 0 at the start of the control, and thereafter, is set to 0 or 1 in accordance with the flowchart shown in FIG. 2, as described later.

In step S20, the CPU determines whether there is a possibility that the vehicle departs from the lane, based on the relative position relation of the vehicle 50 to the lane 54 that is detected by the camera sensor 12, in a way that is known in the technical field. In the case of the negative determination, the CPU ends the control once, and in the case of the positive determination, the CPU causes the control to transition to step S30.

Figure 7:
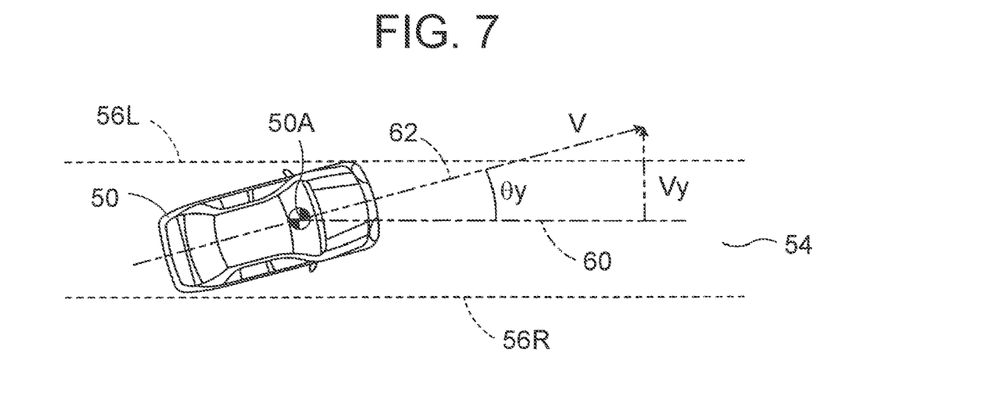
FIG. 7 is a diagram showing a situation where a vehicle travels in a direction inclined with respect to the longitudinal direction of a lane.

On this occasion, the determination of whether there is a possibility that the vehicle 50 departs from the lane may be performed, in the following way, for example. First, as shown in FIG. 7, an angle (inclination angle) θy of a traveling direction 62 of the vehicle with respect to a longitudinal direction 60 of the lane 54 is estimated, based on the image information about the forward sight of the vehicle 50. A movement velocity Vy of the vehicle 50 in a direction perpendicular to the longitudinal direction 60 of the lane 54 is estimated as V sin θy based on the angle θy and the vehicle V. The angle θy is the same as the inclination angle with respect to the white lines 56L, 56R, and therefore is also the oblique motion angle of the vehicle 50.

Further, a distance Dy (not illustrated) in the lane width direction between the white line 56L (first lane border) on a side that the vehicle 50 approaches and the gravity center 50A of the vehicle is estimated. Furthermore, it may be determined that there is a possibility that the vehicle 50 departs from the lane, when Dy−VyΔt, in which Δt is a previously set time, is equal to or less than a previously set reference value Dyc (positive constant number).

In step S30, the CPU determines whether the driver has an intention to perform the lane departure. In the case of the negative determination, the CPU causes the control to transition to step S50, and in the case of the positive determination, the CPU sets the flag Foff to 1 such that the lane departure prevention control is not executed, in step S40.

On this occasion, the CPU determines that the driver has the intention to perform the lane departure by which the vehicle crosses the lane border, when the driver performs at least one of the tilt operation of the turn signal lever 42 in the lane departure direction and the steering operation in the lane departure direction. The steering operation may be determined based on whether the magnitude of the steering torque Ts detected by the torque sensor 32 is equal to or larger than a reference value Tsc or whether the magnitude of a steering angle θ that is the rotation angle of the steering shaft 30 is equal to or larger than a reference value θsc.

The reference value Tsc may be a positive constant number. However, the steering resistance when the turning wheel is turned by driver's steering operation is lower as the vehicle velocity V is higher. Therefore, the reference value Tsc is variably set depending on the vehicle velocity V, such that the reference value Tsc is lower as the vehicle velocity V is higher. Accordingly, it is possible to appropriately determine whether the driver has the intention to perform the lane departure by which the vehicle crosses the lane border, compared to the case where the reference value Tsc is constant regardless of the vehicle velocity.

Furthermore, for example, because of the lateral force to the vehicle 50 due to crosswind, the lateral inclination of a road surface, or the like, or because of the driver's carelessness or the like, the vehicle 50 obliquely moves with respect to the lane 54 needlessly, so that there is a possibility that the vehicle 50 departs from the lane 54. The magnitude of the oblique motion angle θy of the vehicle 50 in that case is small. On the other hand, the magnitude of the oblique motion angle θy of the vehicle 50 in the case where the driver attempts to perform the lane departure is large. Consequently, the CPU determines that the driver has the intention to perform the lane departure by which the vehicle 50 crosses the lane border, also in the case where the magnitude of the oblique motion angle θy of the vehicle 50 is equal to or larger than a reference angle θyc (positive constant number).

In step S50, the CPU executes the lane departure prevention control. That is, the CPU actuates the alarm device 18, and thereby issues the alarm indicating that there is a possibility that the vehicle 50 departs from the lane. Further, the CPU outputs a command signal for the automatic turning, to the EPS ECU 20, and thereby automatically turns the turning wheel 24 with the EPS device 22, such that the vehicle 50 does not depart from the lane.

Figure 3:
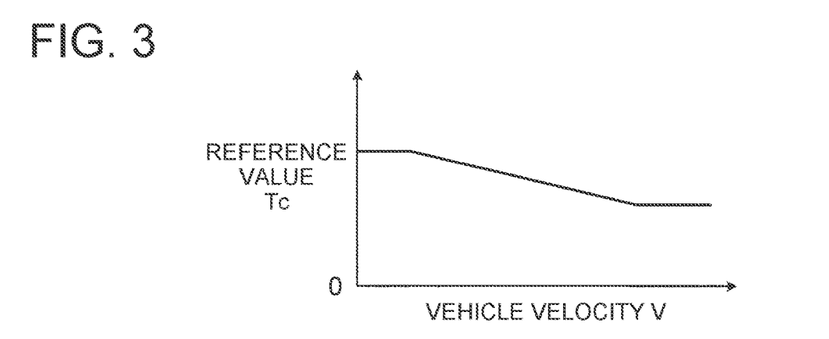
FIG. 3 is a map for computing a reference value Tc about an elapsed time based on a vehicle velocity V.

In step S60, the CPU refers to a map shown in FIG. 3 based on the vehicle velocity V, and thereby computes a reference value Tc about an elapsed time. As shown in FIG. 3, the reference value Tc is variably set depending on the vehicle velocity V, such that the reference value Tc is lower as the vehicle velocity V is higher.

Further, in step S60, the CPU determines whether a resuming condition for the lane departure prevention control is satisfied. In the case of the positive determination, the CPU causes the control to transition to step S80, and in the case of the negative determination, the CPU causes the control to transition to step S70.

On this occasion, the CPU determines that the control resuming condition is satisfied, at the earlier time point of the following time points A and B.

Time point A: a time point when the determination in step S30 changes from the negative determination to the positive determination, that is, a time point when it is determined that the reference time Tc or longer has elapsed from a time point when the driver's intention to perform the lane departure changes from "the driver has no intention" to "the driver has the intention"

Time point B: a time point when it is determined that the vehicle 50 has crossed the lane border and the lane change has been completed, that is, a time point when it is determined that the whole of the vehicle 50 has moved to a lane after the lane change, based on the relative position relation between the vehicle 50 and the white line In step S70, the CPU determines whether the driver has cancelled the intention to perform the lane departure. In the case of the negative determination, the CPU causes the control to transitions to step S90, and in the case of the positive determination, the CPU resets the flag Foff to 0 in step S80. The CPU determines that the driver has cancelled the intention to perform the lane departure when the driver has returned the turn signal lever 42 to a non-tilt position (neutral position), or when the driver has performed a steering operation for cancelling the lane change.

Figure 4:
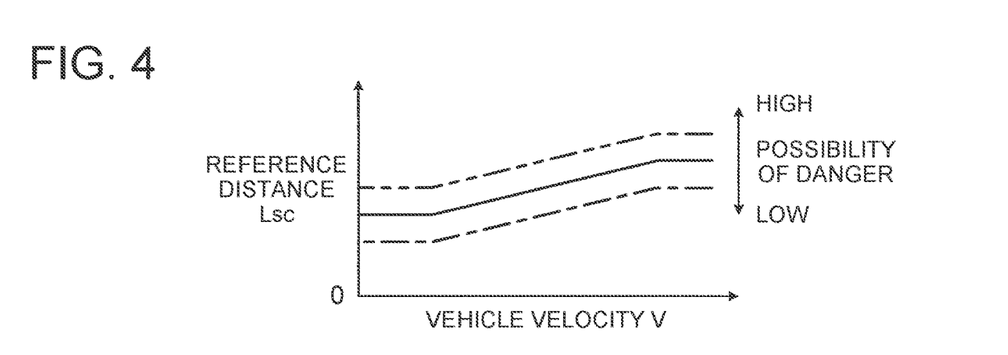
FIG. 4 is a map for computing a reference distance Lsc based on the vehicle velocity V and the possibility of danger.

In step S90, the CPU computes a reference distance Lsc by referring to a map shown by a solid line in FIG. 4 based on the vehicle velocity V. As shown in FIG. 4, the reference distance Lsc is variably set depending on the vehicle velocity V, such that the reference distance Lsc is greater as the vehicle velocity V is higher.

Further, in step S90, the CPU determines whether a second lane border 64 (see FIG. 8 and FIG. 9) exists forward of the vehicle 50 in the traveling direction 62 and whether a distance Ls from the gravity center 50A of the vehicle 50 to the second lane border in the traveling direction 62 is equal to or greater than the reference distance Lsc. In the case of the negative determination, the CPU causes the control to transition to step S130, and in the case of the positive determination, the CPU causes the control to transition to step S100.

In step S100, the CPU computes an index value Id indicating the possibility that the vehicle 50 is placed in a dangerous situation when the vehicle 50 crosses the second lane border. Furthermore, the CPU determines whether the index value Id is equal to or higher than a reference value Idc (positive constant number), that is, whether there is a possibility that the vehicle 50 is placed in a dangerous situation when the vehicle 50 crosses the second lane border. In the case of the positive determination, the CPU causes the control to transition to step S130, and in the case of the negative determination, the CPU causes the control to transition to step S110.

On this occasion, the CPU estimates a situation at the second lane border and a place beyond the second lane border, and computes the index value Id such that the index value Id is higher as the damage to the vehicle 50 is larger when the vehicle 50 crosses the second lane border. For example, in the case where the vehicle 50 collides with a three-dimensional object such as a fence, a guardrail or a grove when the vehicle 50 crosses the second lane border, the index value Id is computed to a higher value than in the case where the vehicle 50 arrives at a non-three-dimensional object such as a grassy area or a gravel area other than roads. Furthermore, in the case where the vehicle 50 arrives at a part of a road such as another lane, a roadside strip or a branch road when the vehicle 50 crosses the second lane border, the index value Id may be computed to zero or a low value. Furthermore, in the case where the three-dimensional object is a fence, a guardrail or a grove, the index value Id may be computed so as to increase in this order. Furthermore, the index value Id may be computed to a higher value as the vehicle velocity V is higher.

Figure 5:
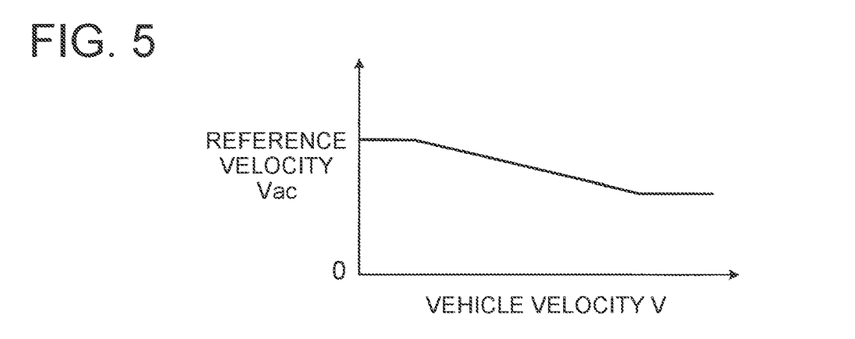
FIG. 5 is a map for computing a reference velocity Vac based on the vehicle velocity V.

In step S110, the CPU computes a reference velocity Vac by referring to a map shown in FIG. 5 based on the vehicle velocity V. As shown in FIG. 5, the reference velocity Vac is variably set depending on the vehicle velocity V, such that the reference velocity Vac is lower as the vehicle velocity V is higher.

Further, in step S110, the CPU computes an approach velocity Va (for example, a decrease rate of the shortest distance between the gravity center 50A and the second lane border 64) of the vehicle 50 to the second lane border 64, based on the detection result of the camera sensor 12 and/or the radar sensor 14. Furthermore, the CPU determines whether the approach velocity Va is equal to or higher than the reference velocity Vac. In the case of the negative determination, the CPU ends the control once, and in the case of the positive determination, the CPU causes the control to transition to step S120.

In step S120, the CPU computes a reference torque Tac by referring to a map shown in FIG. 6 based on the vehicle velocity V. As shown in FIG. 6, the reference torque Tac is variably set depending on the vehicle velocity V, such that the reference torque Tac is lower as the vehicle velocity V is higher.

Further, in step S120, the CPU determines whether the magnitude of the steering torque Ts detected by the torque sensor 32 is equal to or smaller than the reference torque Tac. In the case of the negative determination, the CPU ends the control once, and in the case of the positive determination, the CPU causes the control to transition to step S130.

In step S130, the CPU executes the lane departure prevention control for the second lane border 64. That is, the CPU actuates the alarm device 18, and thereby issues the alarm indicating that there is a possibility that the vehicle 50 crosses the second lane border 64. Further, the CPU outputs the command signal for the automatic turning, to the EPS ECU 20, and thereby automatically turns the turning wheel 24 with the EPS device 22, such that the vehicle 50 does not cross the second lane border 64.

Operation of Embodiment

C1. A case where there is no possibility that the vehicle 50 departs from the lane The negative determination is made in step S10 and step S20. Consequently, the lane departure prevention control is not performed. That is, the actuation of the alarm device 18 and the automatic turning of the turning wheel 24 are not performed.

C2. A case where there is a possibility that the vehicle 50 departs from the lane and where the driver has no intention to perform the lane departure The negative determination is made in step S10, the positive determination is made in step S20, and the negative determination is made in step S30. Consequently, in step S50, the lane departure prevention control is executed. Therefore, by the actuation of the alarm device 18 and the automatic turning of the turning wheel 24, it is possible to avoid the vehicle 50 from departing from the lane 54. For example, it is possible to avoid the vehicle 50 from departing from the lane 54, even when the vehicle 50 obliquely moves with respect to the lane 54 needlessly because of the lateral force to the vehicle 50 due to crosswind, the lateral inclination of a road surface, or the like, or because of driver's carelessness or the like and there is a possibility that the vehicle 50 departs from the lane 54.

C3. A case where there is a possibility that the vehicle 50 departs from the lane and where the driver has the intention to perform the lane departure The negative determination is made in step S10, the positive determination is made in step S20 and step S30, and the flag Foff is set to 1 in step S40. Consequently, in the case where the turn signal lamp 44L or 44R is blinked, where the steering torque Ts is equal to or higher than the reference value Tsc and/or where the magnitude of the steering angle θ is equal to or larger than the reference value θsc, the lane departure prevention control is not executed, and thereafter the positive determination is made in step S10.

C3-1. A case where the resuming condition for the lane departure prevention control is not satisfied and where the intention to perform the lane departure is not cancelled The negative determination is made in step S60 and step S70. Consequently, the automatic turning of the turning wheel 24 by the lane departure prevention control is not executed, and therefore the driver can execute the lane departure such as the lane change as the driver wishes.

C3-1-1. A case where the distance Ls is equal to or greater than the reference distance Lsc and where there is a possibility that the vehicle 50 is placed in a dangerous situation The positive determination is made in step S90 and step S100, and the lane departure prevention control for the second lane border 64 is executed in step S130. Consequently, the alarm device 18 is actuated, and the turning wheel 24 is automatically turned, so that the possibility that the vehicle 50 departs from the lane across the second lane border 64 is reduced.

C3-1-2. A case where the distance Ls is equal to or greater than the reference distance Lsc, where there is no possibility that the vehicle 50 is placed in a dangerous situation, where the approach velocity Va is equal to or higher than the reference velocity Vac, and where the magnitude of the steering torque Ts is equal to or smaller than the reference torque Tac The positive determination is made in step S90, the negative determination is made in step S100, the positive determination is made in step S110 and step S120, and the lane departure prevention control for the second lane border 64 is executed in step S130. Consequently, similarly to the case of C3-1-1, the alarm device 18 is actuated, and the turning wheel 24 is automatically turned, so that the possibility that the vehicle 50 departs from the lane across the second lane border 64 is reduced.

C3-1-3. A case where the distance Ls is equal to or greater than the reference distance Lsc, where there is no possibility that the vehicle 50 is placed in a dangerous situation, where the approach velocity Va is equal to or higher than the reference velocity Vac, and where the magnitude of the steering torque Ts is larger than the reference torque Tac The positive determination is made in step S90, the negative determination is made in step S100, the positive determination is made in step S110, and the negative determination is made in step S120. Therefore, the lane departure prevention control for the second lane border 64 is not executed. The reason why the magnitude of the steering torque Ts is larger than the reference torque Tac is thought to be because the driver hopes that the vehicle 50 approaches the second lane border 64 across the first lane border 56L.

C3-1-4. A case where the distance Ls is equal to or greater than the reference distance Lsc, where there is no possibility that the vehicle 50 is placed in a dangerous situation, and where the approach velocity Va is lower than the reference velocity Vac The positive determination is made in step S90, and the negative determination is made in step S100 and step S110. Therefore, the lane departure prevention control for the second lane border 64 is not executed. In the case where the approach velocity Va is lower than the reference velocity Vac, there is a low possibility that the vehicle 50 arrives at the second lane border 64 in a short time, and therefore the need to execute the lane departure prevention control for the second lane border 64 is low.

As understood from the above description, in the case where the resuming condition for the lane departure prevention control is not satisfied, where the intention to perform the lane departure is not cancelled and where the distance Ls is equal to or greater than the reference distance Lsc, the lane departure prevention control for the second lane border 64 is not executed in principle. However, in the case where there is a possibility that the vehicle 50 is placed in a dangerous situation, or in the case where the approach velocity Va is equal to or higher than the reference velocity Vac and where the magnitude of the steering torque Ts is equal to or lower than the reference torque Tac, the lane departure prevention control for the second lane border 64 is executed.

C3-1-5. A case where the distance Ls is less than the reference distance Lsc

The negative determination is made in step S90, and the lane departure prevention control for the second lane border 64 is executed is step S130. Consequently, similarly to the case of C3-1-1 and the case of C3-1-2, the alarm device 18 is actuated, and the turning wheel 24 is automatically turned, so that the possibility that the vehicle 50 departs from the lane across the second lane border 64 is reduced.

C4. A case where the resuming condition for the lane departure prevention control is not satisfied and where the intention to perform the lane departure is cancelled The negative determination is made in step S60. However, the positive determination is made in step S70, and the flag Foff is reset to 0 for resuming the lane departure prevention control, in step S80. Consequently, when there is a possibility that the vehicle 50 departs from the lane 54, similarly to the case of C2, the negative determination is made in step S10, the positive determination is made in step S20, and the negative determination is made in step S30. Accordingly, in step S50, the lane departure prevention control is executed. Therefore, by the actuation of the alarm device 18 and the automatic turning of the turning wheel 24, it is possible to avoid the vehicle 50 from departing from the lane 54.

C5. A case where the resuming condition for the lane departure prevention control is satisfied The positive determination is made in step S60, and the flag Foff is reset to 0 for the resuming the lane departure prevention control, in step S80. Consequently, the negative determination is made in step S10, and therefore step S20 to step S50 are executed.

Specific Example of Operation

Figure 8:
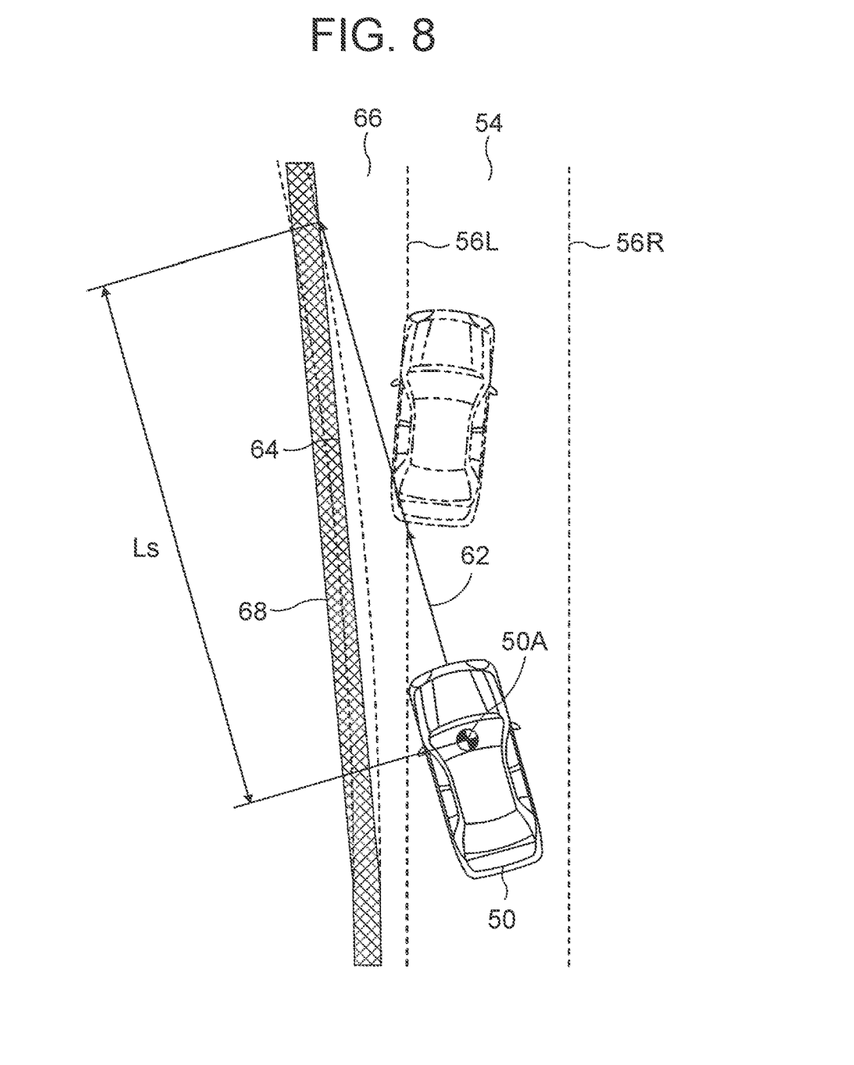
FIG. 8 is a diagram showing a situation where a driver hopes to perform a lane departure from a lane to a side road such that the vehicle moves from the lane to the side road across a first lane border, in the case where the lane departure avoidance device is a conventional lane departure avoidance device.
Figure 9:
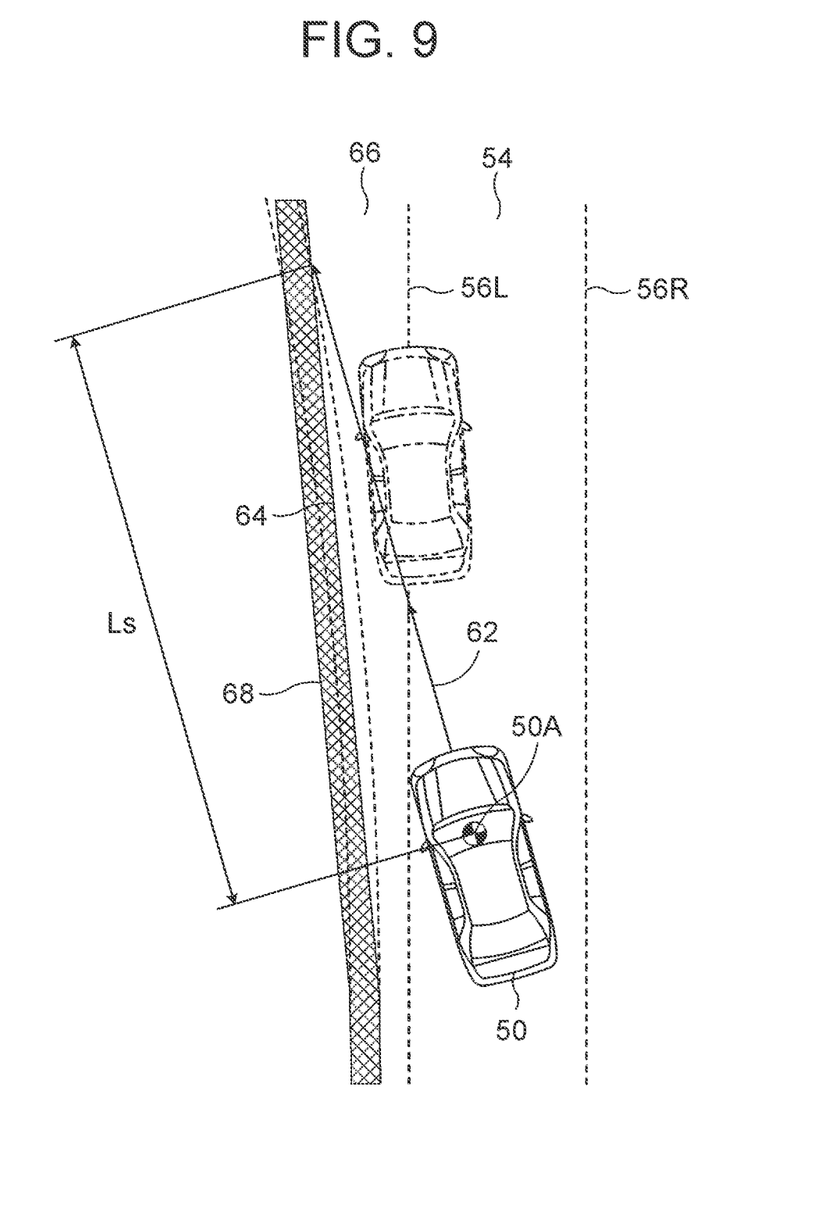
FIG. 9 is a diagram showing a situation where the driver hopes to perform the lane departure from the lane to the side road such that the vehicle moves from the lane to the side road across the first lane border, in the case where the lane departure avoidance device is the lane departure avoidance device in the embodiment.

Next, specific examples of respective operations of a conventional lane departure avoidance device and the embodiment will be described with reference to FIG. 8 and FIG. 9. Each of FIG. 8 and FIG. 9 shows a case where the driver hopes to perform the lane departure from the lane 54 to the side road 66, such that the vehicle 50 moves from the lane 54 to the side road 66 across the first lane border 56L. Further, it is assumed that the flag Foff is 1 when the vehicle 50 is at a position shown by a solid line in each of FIG. 8 and FIG. 9.

As shown in each of FIG. 8 and FIG. 9, the side road 66 extends so as to be inclined at an angle of about 10° with respect to the lane 54. The second lane border 64 is on the side road 66, and the fence 68 that is a three-dimensional object extends along the second lane border 64 on the outside of the second lane border 64. The traveling direction 62 of the vehicle 50 is inclined at an angle of about 25° with respect to the first lane border 56L, and is inclined at an angle of about 15° with respect to the second lane border 64. Consequently, it is assumed that the magnitude of the oblique motion angle θy of the vehicle 50 with respect to the first lane border 56L is equal to or larger than the reference angle θyc, but the magnitude of the oblique motion angle θy of the vehicle 50 with respect to the second lane border 64 is smaller than the reference angle θyc.

Furthermore, it is assumed that the negative determination is made in step S10, the positive determination is made in step S20 and step S30, and the flag Foff is set to 1 in step S40, for the second lane border 64, before the gravity center 50A of the vehicle 50 crosses the first lane border 56L.

Figure 2:
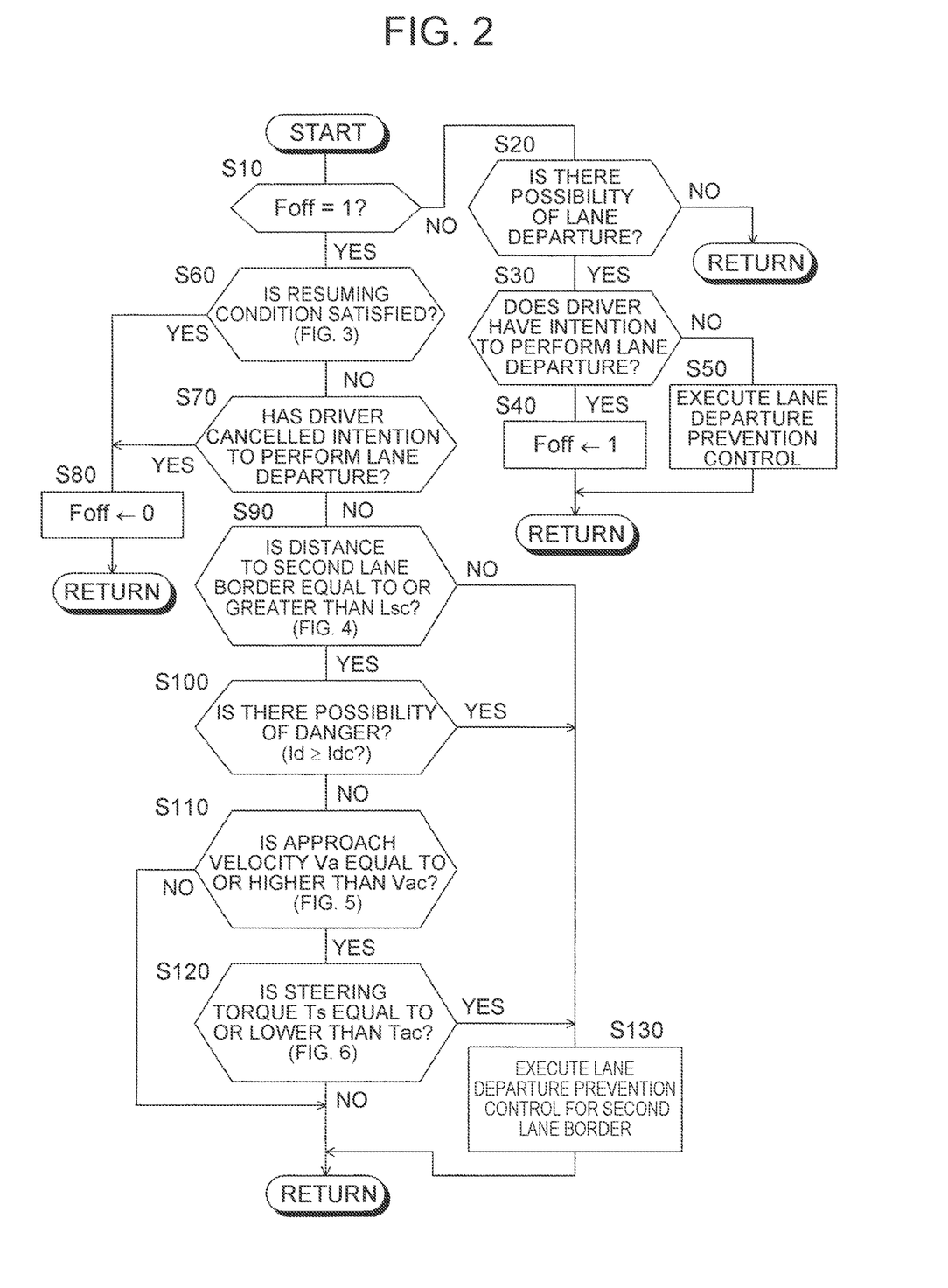
FIG. 2 is a flowchart showing a lane departure avoidance control routine in the embodiment.

It is assumed that the same steps as the step S20 and step S30 are executed for the second lane border 64, instead of step S70 and step S90 to step S120 in FIG. 2, in the conventional lane departure avoidance device. In the case of the conventional lane departure avoidance device, even when it is determined that the second lane border 64 is forward of the vehicle 50, it is determined that the driver has no intention to perform the lane departure, because the magnitude of the oblique motion angle θy of the vehicle 50 with respect to the second lane border 64 is smaller than the reference angle θyc. Consequently, the lane departure prevention control for the second lane border 64 is executed, and therefore the turning wheel 24 is automatically turned such that the gravity center 50A of the vehicle 50 does not approach the second lane border 64, as shown by a virtual line in FIG. 8. Accordingly, an opposite effect is unavoidably exerted, such that the driver cannot smoothly move the vehicle 50 to the side road 66 as the driver wishes.

On the other hand, with the embodiment, the positive determination is made in step S90, and the negative determination is made in step S100. Furthermore, the negative determination is made in step S110, or the positive determination and the negative determination are made in step S110 and step S120 respectively. Consequently the lane departure prevention control is not executed for the second lane border 64, and therefore the vehicle 50 can smoothly move to the side road 66 as the driver wishes, as shown by a virtual line in FIG. 9.

In the above-described example, the side road 66 and the second lane border 64 linearly extend so as to be inclined with respect to the first lane border 56L. However, as shown by a broken line in each of FIG. 8 and FIG. 9, the side road 66 and the second lane border 64 may extend while being curved so as to gradually get away from the first lane border 56L. Further, although not shown in each of FIG. 8 and FIG. 9, the lane 54 and the lane borders 56L, 56R may extend while being curved so as to gradually get away from the second lane border 64.

As understood from the above description, with the embodiment, the lane departure prevention control is not executed in the case where the driver attempts to move the vehicle 50 to the side road 66. Accordingly, the automatic turning of the turning wheel 24 does not interfere with the driving operation by the driver, and the alarm device 18 is not actuated. Therefore, the driver can smoothly move the vehicle to the side road as the driver wishes.

Further, with the embodiment, the reference distance Lsc is variably set depending on the vehicle velocity V, such that the reference distance Lsc is greater as the vehicle velocity V is higher (FIG. 4). Consequently, it is possible to appropriately determine whether the possibility that the vehicle crosses the second lane border is high and whether it is necessary to execute the lane departure prevention control for the second lane border, compared to the case where the reference distance is constant regardless of the vehicle velocity.

Further, with the embodiment, the lane departure prevention control for the second lane border is executed, when it is determined that there is a possibility that the vehicle 50 is placed in a dangerous situation when the vehicle 50 crosses the second lane border 64, in the situation where the suspension of the execution of the lane departure prevention control is continued. Consequently, by the lane departure prevention control, it is possible to reduce the possibility that the vehicle crosses the second lane border and the vehicle is placed in a dangerous situation.

Furthermore, with the embodiment, the lane departure prevention control for the second lane border is executed, when it is determined that the steering torque Ts in the direction in which the vehicle 50 approaches the second lane border 64 is equal to or lower than the reference torque Tac, in the situation where the suspension of the execution of the lane departure prevention control is continued. Consequently, in a situation where there is a possibility that the vehicle crosses the second lane border because the vehicle approaches the second lane border due to driver's carelessness or the like, it is possible to reduce the possibility that the vehicle crosses the second lane border, by the lane departure prevention control.

Particularly, with the embodiment, the lane departure prevention control for the second lane border is executed when it is determined that the velocity Va at which the vehicle 50 approaches the second lane border 64 is equal to or higher than the reference velocity Vac and that the steering torque Ts in the direction in which the vehicle 50 approaches the second lane border 64 is equal to or lower than the reference torque Tac. Consequently, in a situation where the possibility that the vehicle crosses the second lane border is high because the vehicle rapidly approaches the second lane border due to driver's carelessness or the like, it is possible to reduce the possibility that the vehicle crosses the second lane border, by the lane departure prevention control.

Furthermore, with the embodiment, the reference velocity Vac is variably set depending on the vehicle velocity V, such that the reference velocity Vac is lower as the vehicle velocity V is higher (FIG. 5). Consequently, it is possible to appropriately determine whether the possibility that the vehicle crosses the second lane border is high and whether it is necessary to execute the lane departure prevention control for the second lane border, compared to the case where the reference velocity is constant regardless of the vehicle velocity.

Furthermore, with the embodiment, the reference torque Tac is variably set depending on the vehicle velocity V, such that the reference torque Tac is lower as the vehicle velocity V is higher (FIG. 6). Consequently, it is possible to appropriately determine whether the driver attempts to move the vehicle by the steering operation in the direction in which the vehicle approaches the second lane border, compared to the case where the reference torque is constant regardless of the vehicle velocity.

Furthermore, with the embodiment, the lane departure prevention control for the second lane border 64 is executed when it is determined that the distance from the vehicle 50 to the second lane border 64 is less than the reference distance Lsc. Further, the reference distance is variably set depending on the possibility that the vehicle is placed in a dangerous situation when the vehicle crosses the second lane border, such that the reference distance is greater as the possibility that the vehicle is placed in a dangerous situation is higher. Consequently, as the possibility that the vehicle is placed in the dangerous situation when the vehicle crosses the second lane border is higher, it is determined more easily that the distance from the vehicle to the second lane border is less than the reference distance, so that it is possible to effectively execute the lane departure prevention control for the second lane border.

Furthermore, with the embodiment, the reference time Tc is variably set depending on the vehicle velocity V, such that the reference time Tc is shorter as the vehicle velocity V is higher (FIG. 3). Consequently, it is possible to appropriately determine whether the control resuming condition is satisfied, compared to the case where the reference time Tc is constant regardless of the vehicle velocity.

The present disclosure has been described above in detail with the particular embodiment. The present disclosure is not limited to the above-described embodiment, and it is clear to a person skilled in the art that various other embodiments can be made within the scope of the present disclosure.

For example, in the above-described embodiment, the issuing of the alarm by the actuation of the alarm device 18 and the automatic turning of the turning wheel 24 by the EPS device 22 are performed as the lane departure prevention control. However, one of the issuing of the alarm and the automatic turning of the turning wheel 24 may be excluded.

Further, in the above-described embodiment, the reference value Tc about the elapsed time, the reference distance Lsc, the reference velocity Vac and the reference torque Tac are variably set depending on the vehicle velocity, as shown in FIG. 3 to FIG. 6 respectively. However, at least one of the reference value Tc, the reference distance Lsc, the reference velocity Vac and the reference torque Tac may be constant regardless of the vehicle velocity V.

Further, in the above-described embodiment, in step S110, it is determined whether the approach velocity Va of the vehicle 50 to the second lane border 64 is equal to or higher than the reference velocity Vac, and when the positive determination is made, step S120 is executed. However, step S110 may be excluded, and when the negative determination is made in step S100, step S120 may be executed.

Furthermore, in the above-described embodiment, the reference distance Lsc is the distance from the gravity center 50A of the vehicle 50 to the second lane border 64 in the traveling direction 62 of the vehicle 50. However, for example, the reference distance Lsc may be the distance from a front end of the vehicle 50 to the second lane border 64 in the traveling direction 62 of the vehicle 50. Further, the reference distance Lsc may be the shortest distance from a reference position such as the gravity center 50A of the vehicle 50 to the second lane border 64.

Furthermore, in the above-described embodiment, the reference distance Lsc is computed by referring to the map shown by the solid line in FIG. 4. As shown by the solid line, a one-dot chain line and a two-dot chain line in FIG. 4, the reference distance Lsc may be variably set depending on the level of the danger to the vehicle when the vehicle 50 crosses the second lane border. On this occasion, it may be determined that the level of the danger to the vehicle is higher in the case where the vehicle 50 arrives at a non-three-dimensional object such as a grassy area or a gravel area other than roads when the vehicle 50 crosses the second lane border, than in the case where the vehicle arrives at a part of a road such as another lane, a roadside strip or a branch road. Further, it may be determined that the level of the danger to the vehicle is higher in the case where the vehicle 50 collides with a three-dimensional object such as a fence, a guardrail or a grove when the vehicle 50 crosses the second lane border, than in the case where the vehicle 50 arrives at a non-three-dimensional object such as a grassy area or a gravel area other than roads.

What is claimed is:

1. A lane departure avoidance device comprising:
   a vehicle position detection device configured to detect a position of a vehicle relative to a lane; and
   a control unit configured to execute a lane departure prevention control by at least one of automatic turning of a turning wheel and issuing of an alarm, when it is determined that there is a possibility that the vehicle crosses a first lane border based on the position of the vehicle that is detected by the vehicle position detection device and that a driver of the vehicle that crosses the first lane border has no intention to perform a lane departure, and to suspend the execution of the lane departure prevention control until it is determined that a previously set control resuming condition is satisfied, when it is determined that there is a possibility that the vehicle crosses the first lane border and that the driver of the vehicle that crosses the first lane border has an intention to perform the lane departure, wherein
   the control unit is configured to continue the suspension of the execution of the lane departure prevention control, when it is determined that there is a second lane border on a side that the vehicle approaches and that a distance from the vehicle to the second lane border is equal to or greater than a reference distance, in a situation where the execution of the lane departure prevention control is suspended and where the control resuming condition is not satisfied.

2. The lane departure avoidance device according to claim 1, wherein the control unit is configured to variably set the reference distance depending on a vehicle velocity, such that the reference distance is greater as the vehicle velocity is higher.

3. The lane departure avoidance device according to claim 1, wherein the control unit is configured to execute the lane departure prevention control for the second lane border, when it is determined that there is a possibility that the vehicle is placed in a dangerous situation when the vehicle crosses the second lane border, in a situation where the suspension of the execution of the lane departure prevention control is continued.

4. The lane departure avoidance device according to claim 1, wherein the control unit is configured to execute the lane departure prevention control for the second lane border, when it is determined that a steering torque in a direction in which the vehicle approaches the second lane border is equal to or lower than a reference torque, in a situation where the suspension of the execution of the lane departure prevention control is continued.

5. The lane departure avoidance device according to claim 4, wherein the control unit is configured to execute the lane departure prevention control for the second lane border, when it is determined that a velocity at which the vehicle approaches the second lane border is equal to or higher than a reference velocity and that the steering torque in the direction in which the vehicle approaches the second lane border is equal to or lower than the reference torque.

6. The lane departure avoidance device according to claim 5, wherein the control unit is configured to variably set the reference velocity depending on a vehicle velocity, such that the reference velocity is lower as the vehicle velocity is higher.

7. The lane departure avoidance device according to claim 4, wherein the control unit is configured to variably set the reference torque depending on a vehicle velocity, such that the reference torque is lower as the vehicle velocity is higher.

8. The lane departure avoidance device according to claim 1, wherein the control unit is configured to execute the lane departure prevention control for the second lane border, when it is determined that the distance from the vehicle to the second lane border is less than the reference distance, and to variably set the reference distance depending on a possibility that the vehicle is placed in a dangerous situation when the vehicle crosses the second lane border, such that the reference distance is greater as the possibility that the vehicle is placed in the dangerous situation is higher.

* * * * *